United States Patent [19]

Matty et al.

[11] 4,004,966

[45] Jan. 25, 1977

[54] FUME CONTROL FOR SULFUR DIOXIDE AMMONIA ABSORPTION SYSTEMS

[75] Inventors: Robert E. Matty; Stephen S. Strom, both of Alliance, Ohio

[73] Assignee: The Babcock & Wilcox Company, New York, N.Y.

[22] Filed: Dec. 19, 1974

[21] Appl. No.: 534,498

[52] U.S. Cl. .............................. 162/30 R; 423/242
[51] Int. Cl.² ................. D21C 11/12; D21C 11/14; C01B 17/00
[58] Field of Search ................... 423/242, 243, 244; 162/30 R, 30 K

[56] References Cited

UNITED STATES PATENTS

| 2,161,055 | 6/1939 | Johnstone et al. | 423/242 |
|---|---|---|---|
| 2,233,841 | 3/1941 | Lepsoe | 423/242 |
| 2,676,090 | 4/1954 | Johnstone | 423/242 |
| 3,773,472 | 11/1973 | Hausberg et al. | 423/242 |
| 3,843,789 | 10/1974 | Spector et al. | 423/242 |

FOREIGN PATENTS OR APPLICATIONS

| 1,388,690 | 1/1965 | France | 423/242 |
|---|---|---|---|
| 1,104,583 | 4/1965 | United Kingdom | 423/242 |

OTHER PUBLICATIONS

Pulp & Paper Magazine of Canada, 1952 pp. 105–112.

*Primary Examiner*—Oscar R. Vertiz
*Assistant Examiner*—Gregory A. Heller
*Attorney, Agent, or Firm*—Joseph M. Maguire; Vincent M. Fazzari

[57] ABSTRACT

A method of absorbing $SO_2$ by use of an absorbing medium containing ammonia compounds is described. In a process wherein sulfur bearing constituents are combusted, $SO_2$ bearing flue gases are generated. Having been cooled, the flue gases are contacted in a multi-stage absorption system by aqueous absorbents comprised of ammonium compounds which are maintained so that $SO_2$ is removed from the flue gas and the formation of the ammonium sulfite fume is inhibited.

5 Claims, 2 Drawing Figures

TYPICAL AMMONIA BASE ACID SULFITE PLANT

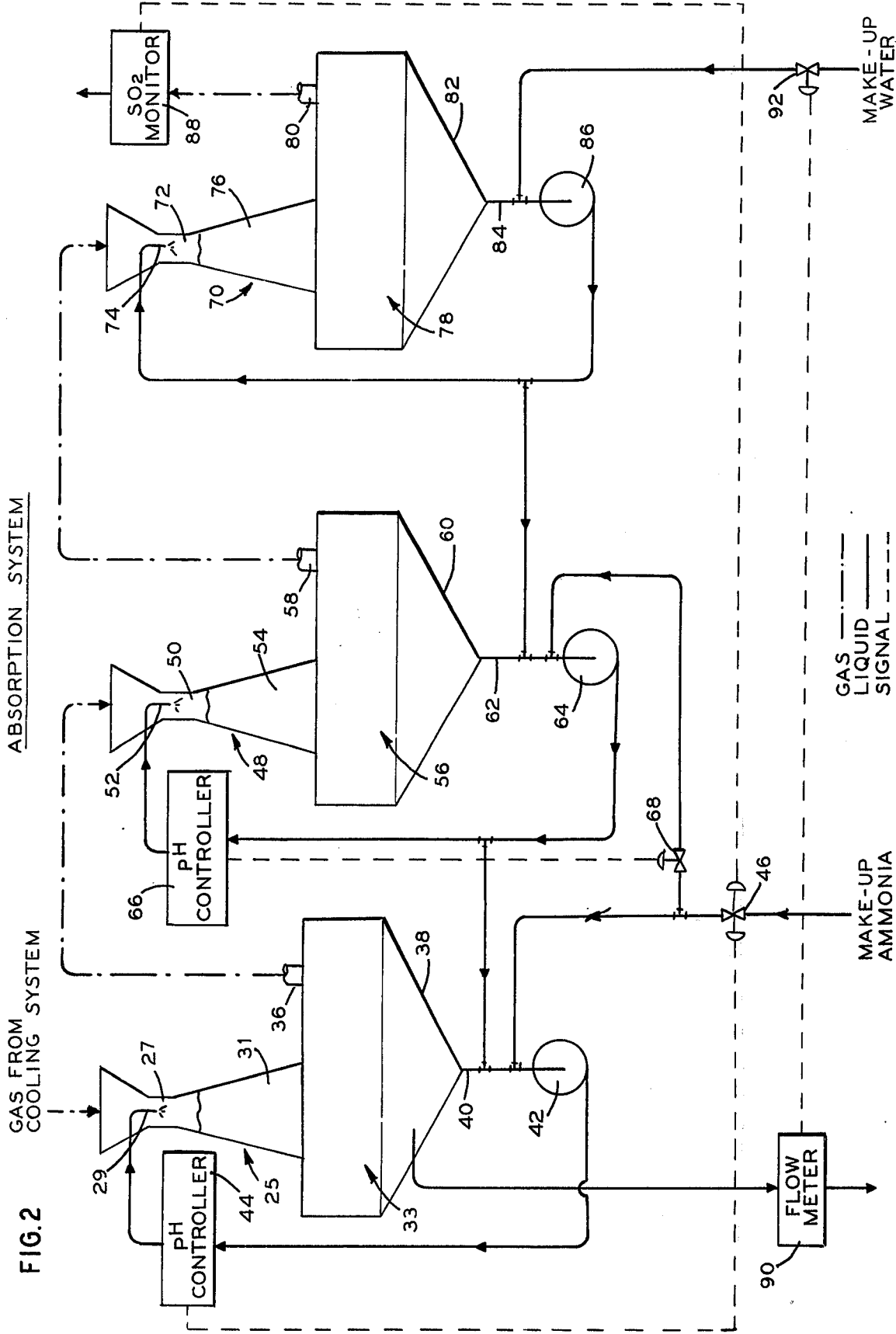

FUME CONTROL FOR SULFUR DIOXIDE AMMONIA ABSORPTION SYSTEMS

BACKGROUND OF THE INVENTION

The present invention is directed to a method of removing the sulfur dioxide from a gas stream containing the same by means of absorption using an aqueous absorption medium containing ammonia bearing compounds.

An ammonia-base pulping system like many of the various other chemical pulping systems, yields a residual waste liquor which not only has a significant heating value, but also contains valuable chemicals in such amounts as to justify chemical recovery. A popular method of chemical recovery employed in many types of pulping processes is concentrating the waste residual liquor, incinerating this concentrated liquor and then reprocessing the chemicals recovered to form solutions useful in the pulping process. In applying this technique to the ammonia base pulping process, one must be prepared to deal with the particular amount of sulfur dioxide present in the flue gases.

Removal of sulfur dioxide by absorption processes has been known and practiced for many years. Aqueous solutions of NaOH, $Ca(OH)_2$, $CaCO_3$ and other solutes have been used with varying degrees of success, expense and maintenance problems. Due to stringent air pollution control regulations, the requirement for an inexpensive, efficient and reliable system has gained re-emphasis.

A practical way to treat the problem is to absorb the $SO_2$ by using an absorbent containing ammonia so that the resulting aqueous solution may be reused in the pulping process. However, it has been found that this type of system generates a fume of ammonium sulfite which can be submicron in nature and causes serious pollution and potential visibility problems when released to the atmosphere. Therefore, it is an objective of the present invention to absorb sulfur dioxide from a gas stream employing absorbing media containing ammonia bearing compounds without producing a fume. Another objective of this invention is to provide a method by which chemicals can be removed from the residual waste liquor to form the product acid used in the digestion process.

SUMMARY OF THE INVENTION

The present invention is directed to absorption of $SO_2$ from a flue gas stream by the use of an absorbing medium containing ammonia compounds maintained so that there is no formation of the ammonium sulfite fume $(NH4)_2SO_3$ during the absorption. More specifically, the invention is related to a process of chemical recovery in an ammonia based pulping system wherein the waste residual liquor is concentrated and incinerated forming a flue gas containing $SO_2$, which after cooling, is introduced into an absorption system wherein $SO_2$ is absorbed using aqueous absorbing media at specific pH values so that no solid ammonium sulfite is formed in the gas phase. The resulting liquid phase can then be reused in the digestion process.

BRIEF DESCRIPTION OF THE DRAWINGS

FIG. 2 depicts the preferred setup for the absorption system to be used in the present invention.

Figure 1:
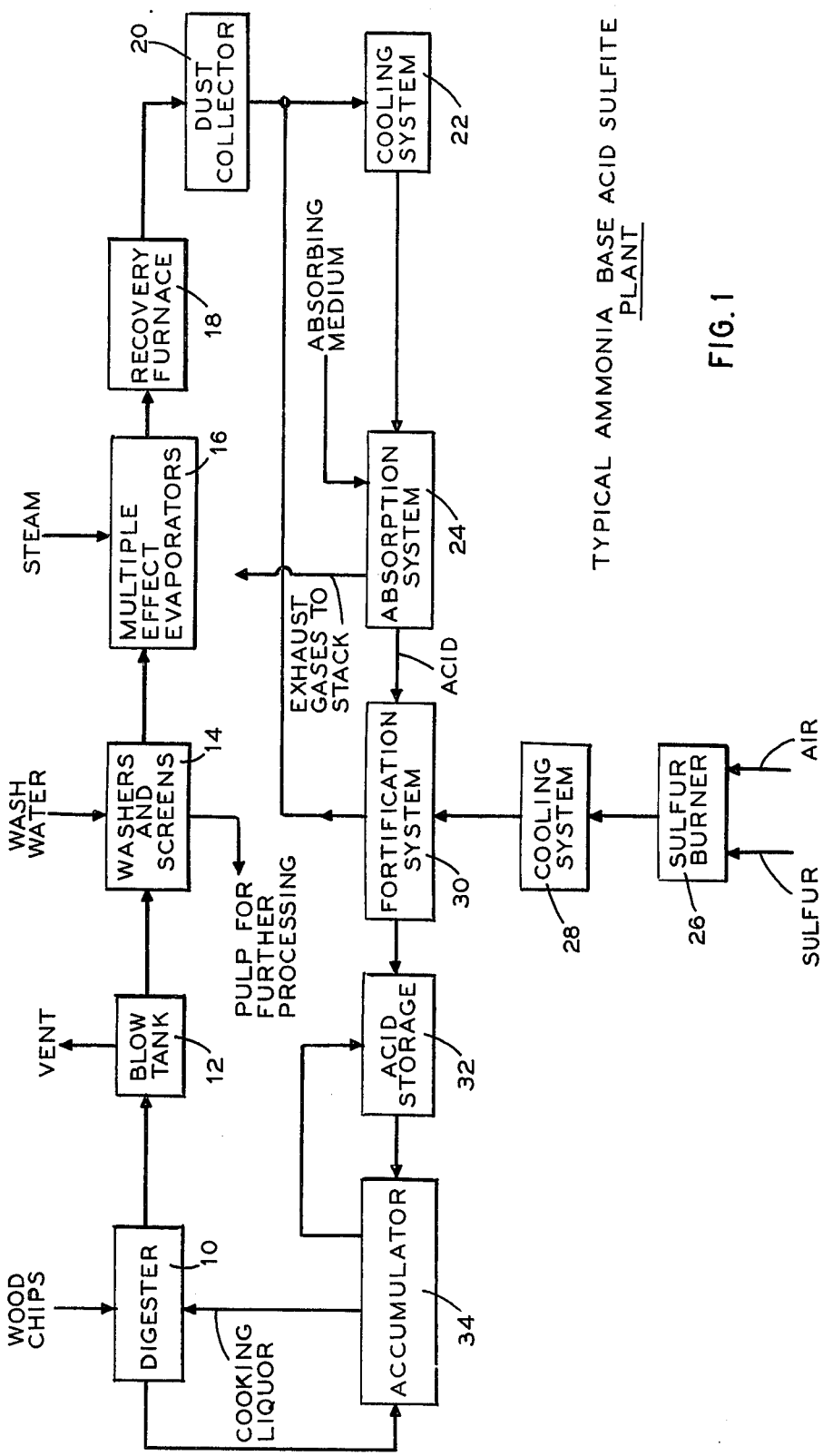
FIG. 1 is a general flow diagram showing that part of a typical ammonia base pulping process that deals with the combustion of and recovery of chemicals from the waste residual liquor.

A more fully understandable description is contained within the framework of the detailed description of the invention.

PREFERRED EMBODIMENT OF THE INVENTION

The present invention is of use in both an acid and a neutral sulfite base pulping process of cellulostic materials, but as will be seen, may be used in many other types of processes wherein sulfur dioxide, $SO_2$ can be removed or recovered from a gas stream by an absorption process. Factors to be considered in using the process are availability and cost of the ammonia compounds as well as a use or market for the product acid.

In FIG. 1, wood, having been prepared for pulping is introduced into the digestor 10 wherein it will be intimately contacted with the cooking liquor under temperature and pressure conditions to bring about a delignification of the fibers. The cooking liquor commonly called the "acid" is of the ammonia base variety and will have the following approximate composition on a weight basis: 6–8g $NH_4HSO_3$ per 100g solution and 1–2 g $H_2SO_3$ per 100g solution. Subsequent to digestion, the contents of digester 10 are transferred to a blow tank 12 wherein gases generated by digestion are vented. The material remaining in the blow tank is the spent cooking liquor (or residual waste liquor), the pulp and other organic remnants of the wood. This liquor-solid mixture moves on for separation to the washers and screens 14 where the spent cooking liquor is separated from the pulp. The pulp is subjected to washing by water for removal of any remaining cooking chemicals from the pulp. The pulp goes on for further processing to make paper and/or various other products.

The residual waste liquor will comprise a dilute solution of the valuable chemicals. Organic matter picked up in the digestion step will also be present. The overall solids concentration in this mixture may be of the order of 10–16% by weight. Since as in most chemical recovery techniques employed in a pulping process, the waste liquor is incinerated, economy of incineration can be improved by removal of a portion of the water from the residual waste liquor. The conventional approach to this concentrating step can be employed in this process and is a method of evaporation carried out in the multiple effect evaporators 16. Generally, five or six evaporators in series comprise this section. A portion of the water having been driven off, the waste residual liquor may now, for example, have a concentration of about 50% solids by weight. In other types of pulping systems, further concentration of the residual waste liquor may be desirable for incineration but in the present process, such further concentration is not desirable since liquor concentrated to greater than 50% solids have high viscosities and may be subject to irreversible gelling.

The concentrated liquor is then introduced into a recovery furnace 18. The preferable manner of introduction is in the form of a spray of finely atomized droplets. In such condition, the droplets quickly absorb the heat developed in the furnace and complete the evaporation of the water from the liquor droplets. Accompanying the evaporation is the combustion of the organic material and the degradation of ammonia $NH_3$ into nitrogen and water vapor. It is in the recovery furnace 18 that sulfur dioxide $SO_2$ is generated from the sulfur bearing constituents. Modern recovery furnaces will be equipped with a heat recovery section (not shown) which can be used to generate steam. Flue gases exhausted from the recovery furnace 18 may be at a temperature of 350° to 500° F. The combustion of the residual waste liquor will result in an $SO_2$ content of approximately 1–2% by volume provided that no auxiliary fuel is used in the combustion. It should be mentioned that 2% should not be treated as the upper limitation of the scope of this invention. $SO_2$ concentrations in excess of 2% can also be successfully treated. Likewise, lower concentrations of $SO_2$ can also be successfully treated. The flue gases may carry particulate matter in the form of non-combustibles which can be removed by a dust collecting device 20. A cyclone is the preferable type of collector to be employed to separate the solid particulate phase from the flue gases. Removal of the solids, which may be in the form of wood ash is desirable since the presence of the wood ash is not desirable in the cooking liquor which will ultimately be formed via the chemical recovery process.

In the typical ammonia base pulping process, the flue gases are cooled subsequent to the particulate removal. Cooling the gases to within 30° F of the adiabatic saturation temperature is sufficient. A preferred method of cooling is direct in nature and accomplished in cooling system 22, wherein water is sprayed directly into the flue gas stream. The water is recycled thus building up the $SO_2$ concentration in the stream. The gas may exit the cooling system at a temperature of about 170° F. Separate cooling of the flue gas is desirable since it will remove much of the $SO_3$. $SO_3$ is undesirable since it tends to form sulfate in the final liquor which has no value and consumes ammonia. The gas exiting cooling system 22 will generally be saturated with water vapor and in some cases may be further cooled below its adiabatic saturation temperature which may be in the range of 160°–170° F. The flue gases can now enter the absorption system 24 wherein by use of the present invention, $SO_2$ will be absorbed from the flue gas without the formation of the ammonium sulfite fume $(NH_4)_2SO_3$. Absorption system 24 will comprise a number of contacting stages wherein the $SO_2$ bearing flue gas will be brought into intimate contact with the liquid absorbing media to effect a mass transfer of the $SO_2$ from the gaseous phase into the liquid. This discharging liquid phase will contain reaction products of $SO_2$ and ammonium bearing absorbing medium. This stream is commonly referred to as the "acid." The preferred arrangement of the absorbing system is depicted in FIG. 2 and will be described more fully hereinafter. The acid stream drawn off from bottom 38 (see FIG. 2) of separator 33 contains 3–6g $NH_4 HSO_3$ per 100g solution and 0.5–1.0g $(NH_4)_2SO_3$ per 100g solution and can be processed to form the cooking liquor employed in the digester 10. The acid is pumped to fortification system 30 which will be more fully described presently. The gases exiting absorbing system 24 enter a stack and are vented to the atmosphere. Also entering fortification system 30 is a flue gas generated by sulfur burner 26. The function of the sulfur burner 26, which may be of the rotary, spray or tubular type is to burn commercial grade sulfur, solid or liquid in form, in the presence of air, thus producing a gas stream containing sulfur dioxide $SO_2$ according to the reaction:

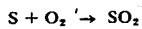

The gas temperature will be in excess of 1300° F. Although theoretically, this gas stream could contain 21% $SO_2$ by volume, it usually contains 15–17%, though some systems report up to 19–20%. To minimize formation of the trioxide $SO_3$, the air which is usually supplied at 10% excess, is preferably dry.

Rapid cooling of the gas exhausting the furnace 26 is desirable to avoid or minimize $SO_3$ formation. A standard sulfur burner cooling system 28 can be employed. The gases now enter fortification system 30 wherein the absorbing medium drawn from bottom 38 of separator 33 will be used to absorb the $SO_2$ from the flue gases exhausting from cooling system 28. The fortification system may contain one or two packed towers in series for the countercurrent contacting of the $SO_2$ bearing gases and the absorbing medium. Absorption of up to 95% of the $SO_2$ can be expected in the first tower alone. The gas exhausting the fortification system 30 (see FIG. 1) may be recycled and combined with the flue gases leaving dust collector 20. The fortified absorbing medium passes to a brick-lined storage tank 32 from which it can be drawn as needed and sent to accumulator 34. Accumulator 34 is sized to hold enough for 2–3 digesters and is maintained under pressure. The pressure varies with the percentage of free $SO_2$ in the liquor and the temperature. Relief gases from digester 10 are led into the accumulator which may be brick-lined or stainless steel in construction. The liquor contained in the accumulator 34 will be suitable for use as a cooking liquor in digester 10.

FIG. 2 depicts the preferred set up for an absorption system to be used in the present invention. As shown, a three-stage system is preferable but the present invention may be carried out with two or more than three contacting stages. While Venturi-like absorption devices are illustrated, other mass transfer devices such as packed towers may be employed.

The flue gases are ducted from cooling system 22 and enter the first stage 25 of absorption system 24 wherein the gases are accelerated in a Venturi-like device 27 and brought into intimate contact with the absorbing medium which will be more fully described hereinafter. The absorbing medium may be introduced by a single or a plurality of spray nozzles 29 which may be positioned in or upstream of the Venturi-like device. The spray nozzles 29 atomize the absorbing medium by mechanical pressure thus generating a large contact surface for mass transfer. Other techniques of producing fine droplets may be employed in practicing this invention. One such technique is introducing the absorbing medium into the Venturi-like device by an overflow weir or low pressure spray and allowing the velocity of the gas to produce a shattering effect thus generating fine droplets and providing the contact surface area for mass transfer. The gases can then pass into deceleration zone 31. Following deceleration zone 31 is a separator 33 which will act to remove the liquid droplets from the gas stream. This separator 33 may be of the tangential inlet or radial inlet type and if desired, it may be supplied with internal baffles (not shown) or demister pads (not shown). The gases leave separator 33 via outlet 36 and are ducted to the second absorption stage 48 which is substantially identical to first absorbing stage 25 as is the third absorbing stage 70. The used absorbing medium collects in bottom 38 and is drained by pipe 40 into pump 42. A portion of the absorbing medium can be recycled with the addition of makeup ammonia.

The gas phase is then ducted to second absorption stage 48 where it is accelerated in Venturi-like device 50 while being contacted with absorbing medium from nozzle means 52 which is substantially identical to nozzle means 29. The gas continues into deceleration zone section 54, into separator 56 and leaves by outlet 58. The same sequence of operation is repeated in the third absorbing stage 70 where 72 is the Venturi-like device, 74 the nozzle means, 76 the deceleration zone, 78 the separator and 80 the outlet. In the second and third absorption stages, the liquid has collected in separator bottoms 60 and 82 respectively and is drained by pipes 62 and 84 respectively into pumps 64 and 86 respectively. These items are all substantially identical to their counter parts in the first absorption stage.

Formation of ammonium sulfite fume is believed to occur by the following two step mechanism:

1. $NH_4OH$ (aq.) $\rightarrow NH_{3(g)} + H_2O$
2. $2NH_{3(g)} + SO_{2(g)} + H_2O_{(g)} \rightarrow (NH_4)_2 SO_{3(s)}$ It has been found that by maintaining the absorbing medium so that no ammonium hydroxide exists in solutions in contact with the flue gas, the ammonia vapor pressure over the solutions approaches zero thereby eliminating the first step of the above two step mechanism and inhibits the formation of the ammonium sulfite fume. Ammonium hydroxide's presence can be prevented provided there is always ammonium bisulfite present and the makeup ammonia is controlled so that the pH of the spray liquor is maintained relatively constant at a pH below 5.9 and never allowed to exceed 5.9. This can be accomplished provided that all the makeup ammonia is not added at one point and that the points where the makeup ammonia is added are carefully chosen.

As previously mentioned, the prevention of the formation of the ammonium sulfite fume is accomplished by pH control and the selective addition of the makeup ammonia at certain points in the system. To further enable an understanding of the liquid circuit of the present invention, it is essential to understand the control system which can be utilized to allow the system to operate on a continuous basis. To employ a three-stage absorption system as depicted in FIG. 2, it is necessary to control the pH of any stream containing ammonia which will be brought into contact with the flue gases. Conventional pH control means numbered 44 and 66 in FIG. 2 can be employed for this purpose. Controller 66 used in conjunction with second absorbing stage 48 is set so as to regulate the pH of the absorbing liquor entering Venturi-like device 50 so that the pH will be no higher than 5.9. Controller 44 used in conjunction with absorbing stage 25 is set so that the maximum allowable pH of the absorbing medium entering Venturi-like device 27 is 5.9. Controller 44 will also act as an overriding device as will be more fully explained hereinafter. The used absorbing medium from second absorption stage 48 has been collected in bottom 60 and drains through pipe 62 into pump 64. Likewise, the absorbing medium employed in third absorbing stage 70 is collected in bottom 82 of separator 78 and drains by pipe 84 into pump 86.

In practicing the present invention, ammonia must be added to the absorption system to replace the ammonia contained in what is drawn off to produce the product acid. Makeup ammonia valve 46 is normally open and may be of the modulating type so as to supply an increase or decrease need of the system. Such system need can be based on producing a specified amount of product acid at a certain concentration, or the makeup ammonia can be based on the $SO_2$ content of the flue gases exhausting from the absorption system. As shown in FIG. 2, an $SO_2$ monitoring device 88 can be placed in the exhaust stream to provide continuous information of the $SO_2$ content. Such a device may be of the variety that extracts a sample of the gas or may be of the in situ type. By signal means, pneumatic, hydraulic or electronic, makeup ammonia valve 46 can be further opened or restricted to regulate the amount of makeup ammonia entering the system. Left unrestrained, ammonia could be added in such quantities as to drive the pH above that desired. To overcome this eventuality, controller 44 is set at the maximum allowable pH and should this pH be reached, controller 44 can override the signal from monitor 88 and close off or restrict makeup valve 46. Controller 66 is set to maintain a pH not in excess of 5.9 and can call for makeup ammonia via signal to valve 68. As indicated in FIG. 2, a portion of the absorbing medium entering pumps 86 and 64 is recycled to Venturi-like devices 72 and 50 respectively and a portion is transferred to absorbing stage 48 and 25 respectively. This gives a countercurrent flow effect and allows a more concentrated product to form as well as improving overall absorption efficiency. Makeup water can be added to the system via valve 92. Flow meter 90 measures what is drawn from bottom 38 of separator 33 which is sent to form the product acid. By signal means, makeup water can be added via valve 92 as needed.

To fully understand the application of the present invention, it is necessary to become familiar with the chemical reactions and how the constituents will behave under the influence of various conditions.

At a pH of 5.9 or lower, the absorbing media will contain both the monosulfite and the bisulfite. Contact with the $SO_2$ of the flue gases will leave the bisulfite unaffected but will react with the monosulfite to form additional bisulfite:

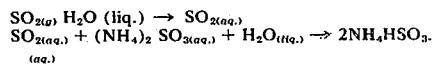

At a pH above 5.9, the ammonia has a vapor pressure over the liquid which combines with the $SO_2$ gas to form the monosulfite fume:

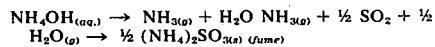

So it will be seen that by pH control, it is possible to exclude ammonia from the vapor phase and thereby inhibit the formation of the monosulfite fume.

As in a great number of absorption processes, the expected efficiencies will vary in accordance with a number of parameters. In the use of this invention, it will be found most beneficial to maintain an L/G minimum ratio of 5-6 lbs. of absorbing medium to lbs. of dry gas in each of the stages. Of course, the method of pH control to inhibit fume formation will work at virtually any L/G ratio, but maximum benefit of the absorption capabilities of the system are experienced at 5-6 and above. In the preferred method of practice of this invention, Venturi scrubbers have been used as absorption stages. At the L/G ratios indicated, it is recommended that the gas velocities in each of the stages be of the order of at least 60-75 feet/second. Of course, other velocities may be used in practicing this invention. Operation of the Venturi-like devices in this manner should result in pressure drops of about 2–3 inches w.g. When other varieties of mass transfer equipment are employed conventional flow rates and velocities can be used.

The practice of this invention in accordance with the foregoing results in $SO_2$ emissions from the second absorption stage of approximately 250 ppm on a dry gas basis. Depending on pollutant requirements, this gas stream may be vented to the atmosphere. Where more rigorous regulations are in force, the third or possibly a fourth stage may be added to and operated in accordance with the above teachings. Those familiar with the art will understand that the present invention can theoretically be practiced using only one absorption stage. In such case, it is expected that lower efficiencies will result and as such may not be desirable.

While in accordance with the provisions of the statutes, we have illustrated and described herein the best form and mode of operation of the invention now known to us, those skilled in the art will understand that certain features of our invention may sometimes be used to advantage without a corresponding use of other features.

We claim:

1. A fume free method of recovering chemicals useful in forming a digesting cooking liquor from an ammonia base cooking liquor pulping process of cellulosic materials wherein a residual waste liquor is formed comprising:
   combusting the waste liquor to form a flue gas containing sulfur dioxide;
   cooling the flue gas;
   passing the cooled flue gas through a plurality of absorbing zones, while
   contacting the gas with an aqueous solution of ammonium monosulfite-bisulfite of pH not in excess of 5.9 pH units; adding ammonia to the aqueous solution in each of the said absorbing zones while maintaining the pH of the aqueous solution at no greater than 5.9 pH units; and
   separating the aqueous solution from the flue gas for use in forming the cooking liquor.

2. A method as in claim 1 wherein the flue gas is accelerated in the said absorbing zones.

3. A method as in claim 1 wherein the flue gas is cooled to within 30° of its adiabatic saturation temperature.

4. A method as in claim 1 wherein the aqueous solution of ammonia monosulfite-bisulfite is in the form of a fine spray when contacting in each absorbing zone.

5. A method as in claim 1 wherein the aqueous solution is processed to form the cooking liquor.

* * * * *